United States Patent [19]
Brucher

[11] 3,906,577
[45] Sept. 23, 1975

[54] SPRING-LOADED SCRAPER BLADE HOLDER ON SCRAPER SHAFTS OF SCRAPER COOLERS

[75] Inventor: Peter Brucher, Berlin, Germany

[73] Assignee: Borsig Gesellschaft mit beschrankter Haftung, Berlin, Germany

[22] Filed: Oct. 2, 1973

[21] Appl. No.: 402,859

[30] Foreign Application Priority Data
Oct. 3, 1972 Germany............................ 2248964

[52] U.S. Cl................ 15/104.1 R; 29/81 F; 51/353
[51] Int. Cl.............................................. B08b 9/02
[58] Field of Search..... 15/104.05, 104.09, 104.1 R, 15/104.14, 88; 165/94, 95; 166/175, 176; 51/331, 352, 353 X, 355; 29/81 F, 81 G

[56] References Cited
UNITED STATES PATENTS
1,389,850  9/1921  Stroberger et al..................... 51/353
2,275,939  3/1942  Baker......................... 15/104.1 R X

*Primary Examiner*—Edward L. Roberts
*Attorney, Agent, or Firm*—Walter Becker

[57] ABSTRACT

A scraper blade holding system on scraper shafts of scraper coolers in which the scraper blade, by means of springs, connecting elements, and guiding elements for the springs, is in continuous contact with the inner wall of the inner tube of a double tube structure. The scraper blade holding system is characterized primarily in that transverse bores of the scraper shaft end are freely axially movably arranged holding bolts which at their outer ends directed to the inner wall of the inner tube are equipped with tubular sleeves connected to the scraper blades, which sleeves are pressed outwardly by helical pressure springs surrounding the holding bolts and are supported by the scraper shaft.

3 Claims, 2 Drawing Figures

SPRING-LOADED SCRAPER BLADE HOLDER ON SCRAPER SHAFTS OF SCRAPER COOLERS

The present invention relates to a scraper blade holder on scraper shafts of scraper coolers, according to which the scraper blade by means of springs, connecting elements and guiding elements of the springs is kept in continuous contact with the inner wall of the inner tube of a double tube element. With scraper shafts of this type it is necessary to press the scraper blades arranged over the entire length of the shaft against the inner wall of the inner tube or pipe in which the scraper shaft rotates. The scraper blades are intended to scrape the crystals, impurities, or incrustations, from the inner wall, which form during the cooling or heating up of the particular medium employed so that a uniform permanent good heat transfer will be assured between the medium to be cooled or heated up in the inner pipe and the cooling or heating medium outside the inner pipe.

It is known for purposes of meeting these requirements to establish a connection between the scraper shaft and the scraper blades by means of leaf springs which thus have to assure a proper holding of the scraper blades and a pressing of said scraper blades against the inner wall of the inner pipe. The leaf springs which at the same time have to absorb the circumferential forces must automatically have a thin thickness in order with the necessary spring strokes to keep the pressing force of the scraper blades low in order to avoid unnecessary wear. This, however, results in the drawback that only low circumferential forces are admissible, which means that the useful employment is limited, or expressed differently, that when employing great circumferential forces, the springs are bound to break. In addition thereto, this type permits only a certain direction of rotation of the scraper shaft.

In an endeavor to keep the circumferential forces away from the springs which press the scraper blades outwardly, it is also known to connect the scraper blades to so-called holding pistons which are located in welded-on sleeve pipes transverse to the scraper shaft and which in view of the arrangement of pins inserted diametrically into the sleeve pipe, can move in axial direction within certain limits, said pins being respectively located in a large transverse passage of the holding pistons. Pressure springs respectively centrally arranged press the holding pistons with the scraper blades toward the outside, while the circumferential forces generated by the scraping operation are absorbed solely by the holding piston and the sleeve pipes and both directions of rotation of the scraper shaft are admissible. The pressure springs in the holding pistons and the sleeve pipes may lose their effect due to said holding pistons getting jammed in the sleeve pipes. Such jamming may be the result of the medium entering from the inner pipe into the pressure spring chamber and by crystallization of said medium during the cooling-off step.

It is therefore, an object of the present invention to overcome these drawbacks and more specifically, so to design the scraper blade holding system that high circumferential forces can be absorbed by the latter in either direction of rotation of the scraper shaft.

It is a further object of this invention to provide a scraper blade holding system, as set forth in the preceding paragraph, in which the spring effect against the scraper blades will be maintained in each condition of operation by keeping the pressure springs free from crystals and impurifications.

It is still another object of this invention to provide a scraper blade holding system of the type set forth above, in which the holding system for the scraper blades and thus the scraper blades are automatically centered by the resiliency of the scraper blade holding system.

Finally, it is an object of the present invention to design a scraper blade holding system of the above mentioned type in a simple and inexpensive manner.

These and other objects and advantages of the invention will appear more clearly from the following specification, in connection with the accompanying drawings, in which.

The scraper blade holding system according to the present invention is characterized primarily in that in transverse bores of the scraper shaft there are freely axially movably arranged holding bolts which at their long ends directed toward the inner wall of the inner pipe are equipped with tubular sleeves connected to the scraper blades, said sleeves being pressed outwardly by helical pressure springs which surround the holding bolts and are supported by the scraper shaft.

In order with a holding bolt having two long ends to cause the two scraper blades to exert a continuous pressure upon the inner pipe, it is suggested according to a further embodiment of the invention, respectively to provide both ends of the holding bolts with helical pressure springs and tubular sleeves while the scraper blades arranged in axial slots of the tubular sleeve are, by pins, firmly connected to the tubular sleeves. Furthermore, it is further suggested according to the present invention for the connections of the two ends of the holding bolt with the tubular sleeves, to provide the holding bolts with stationary pins which are arranged diametrically on both sides and protrude outwardly, said pins extending into transverse bores of the tubular sleeves with a considerably greater diameter.

If it is desired per holding bolt to exert pressure from one side only by a scraper blade against the inner pipe, it is suggested according to the invention to provide only one end of the holding bolt with a helical pressure spring and a tubular sleeve while the scraper blade and the holding bolt are, by means of pins, firmly connected with the tubular sleeve. Furthermore, the other short end of the holding bolt is designed as a collar, the circular annular surface of which, has a great play with regard to the outer mantle of the scraper shaft.

Figure 1:
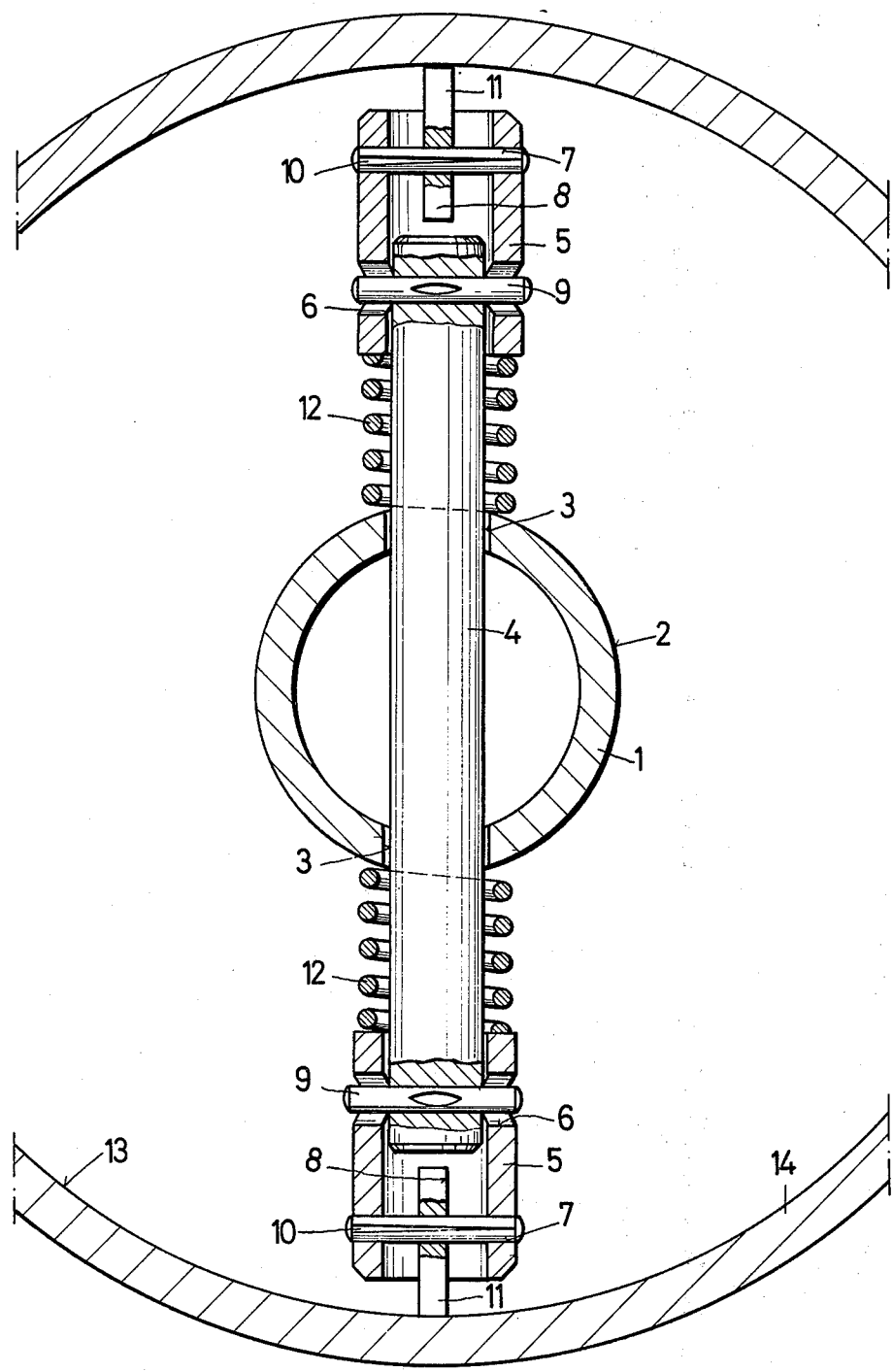
FIG. 1 illustrates a scraper blade holding system according to the invention with a tubular sleeve at both ends of the holding bolt.
Figure 2:
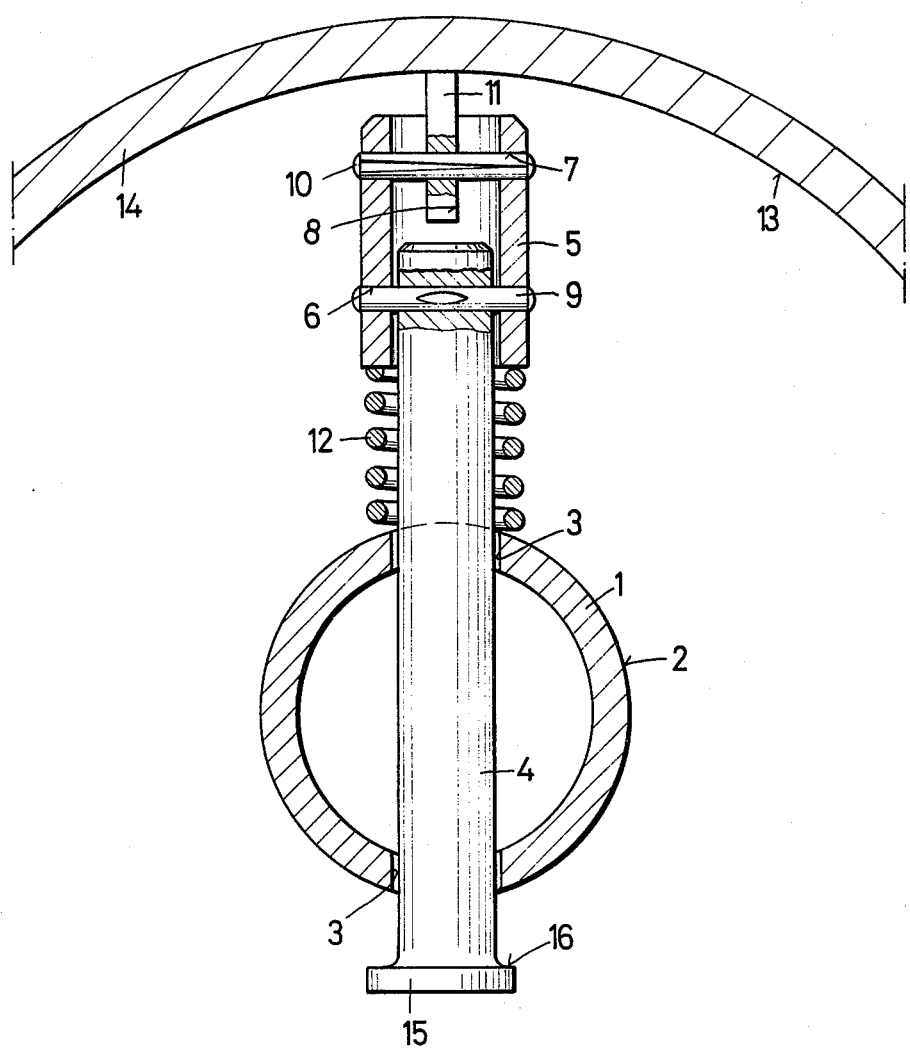
FIG. 2 illustrates a scraper blade holding system with a tubular sleeve at one end only of the holding bolt.

Referring now to the drawings in detail, the arrangement shown in FIGS. 1 and 2 comprises a scraper shaft 1 and an outer mantle 2 of the scraper shaft of a scraper cooler. The scraper shaft 1 has a transverse bore 3 for passing therethrough the holding bolt 4. At the long end, or ends, of the holding bolt 4, the tubular sleeve 5 with its transverse bores 6 and 7 and the axial slot 8 surrounds with a portion of its length the holding bolt 4. The connection between the holding bolt 4 and the tubular sleeve 5 is effected by means of the pin 9 which is stationarily arranged in the holding bolt 4 and protrudes diametrically on both sides toward the outside.

According to FIG. 1, the holding pin 9 extends into the transverse bore 6 which has a considerably greater diameter than the pin 9, whereas according to FIG. 2, the pin 9 extends into a transverse bore 6 which has substantially the same diameter as pin 9. The pin 10 in the transverse bore 7 of the tubular sleeve 5 connects the scraper blade 11 arranged in slot 8 with the tubular sleeve 5. The helical pressure spring 12 rests against the outer mantle 2 of the scraper shaft 1 and presses the tubular sleeve 5 outwardly and thereby presses the scraper blade 11 against the inner wall 13 of the inner pipe 14 of the double pipe element. According to FIG. 2, the holding bolt 4 has a closing member a collar 15, the annular surface 16 of which, points toward the scraper shaft 1 and has a relatively great play with the outer mantle 2 of the scraper shaft 1.

The operation of the device according to the invention is as follows: According to the embodiment illustrated in FIG. 1, both helical pressure springs 12 simultaneously press their tubular sleeve 5 with their scraper blades 11 in a diametrically opposite direction against the inner wall 13 of the inner pipe 14. In view of the wear between the scraper blades 11 and the inner tube 14, and due to the respective considerable play between the transverse bore 6 in the tubular sleeve 5 and the pin 9 in the holding bolt 4, a continuous pressure of the scraper blades 11 against the inner wall 13 will be assured. If the scraper shaft 1 in which the holding bolt 4 is easily slidably guided, is pressed out of center by the rough scraper cooler operation, the further compressed helical pressure spring 12 will immediately exert on its part, a considerably greater pressure than the other helical pressure spring 12, the tension of which decreases, against the scraper shaft 1. Consequently, the scraper shaft 1 is pressed again toward the center of the inner pipe 14 whereby an automatic centering of the scraper shaft 1 is effected.

According to the embodiment of FIG. 2, in which only one end of the holding bolt 4 is provided with the elements of the scraper blade holding system, the two most important parts on the tubular sleeve 5, namely, the scraper blade 11 is, by means of the pin 10, and the holding bolt 4 is by means of pin 9 without play in axial direction of the holding bolt 4 connected to the tubular sleeve 5. Here, the continuous pressure of the scraper blade 11 against the inner pipe 14 during a wear on the scraper blades 11 and the inner pipe 14 is possible, in view of the fact that between the annular surface 16 of the collar 15 and the scraper shaft 1, the great play is provided. The automatic centering of the scraper shaft 1 is, in this instance, effected due to the completely identical scraper blade holding systems being distributed uniformly in longitudinal and circumferential direction of the scraper shaft 1.

As will be evident from the above, the advantages realized by the present invention consist in particular in that due to the fact that the holding bolts and tubular sleeves are designed rather strong, high circumferential forces can be transmitted from the scraper blades onto the scraper shaft. Independently therefrom, the spring thrust of the helical pressure springs can be designed in an optimum manner with regard to the wear of the scraper blades and of the inner pipe. This is due to the self-cleaning of the springs by the continuous movements of the helical pressure springs in the flow of the medium, more specifically, in view of the helical pressure springs on both sides of the holding bolts according to FIG. 1 and due to the uniform distribution of the scraper blade holding system according to FIG. 2 in the longitudinal and circumferential direction of the scraper shaft and the automatic centering of the scraper shaft inherent thereto while both directions of rotation of the scraper shaft are possible. Moreover, the manufacture of the scraper holding system is simple and can be effected in an inexpensive manner.

It is, of course, to be understood that the present invention is, by no means limited to the specific showing in the drawings, but also comprises any modifications within the scope of the appended claims.

What I claim is:

1. For use in connection with a tube the inner wall of which is to be scraped in a continuous manner, the combination of a scraper shaft with a plurality of diametrical bores therethrough, holding bolts respectively extending through and freely slidable in said bores, tubular sleeves respectively connected to at least one end portion of said holding bolts, each of said tubular sleeves being provided with a diametrical slot, scraper blade means located in said slots, connecting means respectively connecting said scraper blade means to said tubular sleeves for scraping engagement with the inner wall of a tube to be scraped, and helical pressure spring means interposed between said scraper shaft and said tubular sleeves while respectively surrounding the pertaining holding bolts and urging said pertaining tubular sleeves and thereby the scraper blade means connected thereto in radial outward direction.

2. The combination according to claim 1, in which each end portion of each of said holding bolts has a tubular sleeve connected thereto, and in which each of said tubular sleeves has a first diametrical bore therethrough and a second diametrical bore therethrough spaced from said first diametrical bore in substantially parallel arrangement thereto, said first bore being closer to the respective outer end portion of the pertaining holding bolt than said second bore, first pin means respectively extending through the pertaining first bores but having a smaller cross section than that of said first bores, and second pin means forming said connecting means and extending through said pertaining second bores while having a diameter substantially equalling that of said second pin means.

3. The combination according to claim 1, in which each of said holding bolts has a longer and a shorter end respectively protruding from opposite sides of said scraper shaft, and in which only the longer protruding holding bolt ends are each provided with a tubular sleeve and a helical pressure spring, whereas the shorter protruding holding bolt ends are each provided with a collar for preventing said last mentioned holding bolt ends from being pulled into the interior of said scraper shaft.

* * * * *